United States Patent [19]

Kaplan

[11] Patent Number: 5,663,536
[45] Date of Patent: Sep. 2, 1997

[54] SOUND ATTENUATION ASSEMBLY FOR AIR-COOLING APPARATUS

[75] Inventor: Vladimir Kaplan, Silver Spring, Md.

[73] Assignee: Amsted Industries Incorporated, Chicago, Ill.

[21] Appl. No.: 541,853

[22] Filed: Oct. 10, 1995

[51] Int. Cl.⁶ .................................................. E04F 17/04
[52] U.S. Cl. .................................................. 181/224
[58] Field of Search .......................... 181/224, 225, 181/229, 232, 210, 214, 218, 264, 268, 270, 275, 283

[56] References Cited

U.S. PATENT DOCUMENTS

| | | | |
|---|---|---|---|
| 1,865,677 | 7/1932 | Cheyney | 181/224 |
| 3,265,372 | 8/1966 | Bradley . | |
| 3,290,025 | 12/1966 | Engalitcheff, Jr. . | |
| 3,347,338 | 10/1967 | Childress | 181/224 |
| 3,378,100 | 4/1968 | Welty | 181/224 |
| 3,437,319 | 4/1969 | Engalitcheff, Jr. et al. . | |
| 3,454,128 | 7/1969 | Nopper | 181/224 |
| 3,572,657 | 3/1971 | Bradley, Jr. . | |
| 3,575,387 | 4/1971 | Bradley, Jr. . | |
| 3,929,435 | 12/1975 | Engalitcheff, Jr. . | |
| 4,699,211 | 10/1987 | Geary et al. . | |
| 4,873,028 | 10/1989 | Garrish . | |
| 4,891,169 | 1/1990 | Kaplan et al. . | |
| 5,426,268 | 6/1995 | Yazici et al. | 181/224 |

OTHER PUBLICATIONS

Looseleaf Product Page 1B043 (4d/07–26/94) from MAP of Easton, Inc.—"Multipurpose Absorbers".

*Primary Examiner*—Khanh Dang
*Attorney, Agent, or Firm*—Edward J. Brosius; F. S. Gregorczyk; Stephen J. Manich

[57] ABSTRACT

A sound attenuation assembly for In a forced-draft, liquid-to-air cooling apparatus, a sound attenuation assembly having at least two rows of elongate, generally cylindrical members arranged across the air inlet of the assembly to provide a blockage to the line of sight to the air flow through the sound attenuation assembly, to provide a multiple barrier effect of frontal impact on a sound front travelling through the assembly, and to provide the elongate members of sound absorbing material, which members provide improved sound attenuation associated with the force-draft apparatus while reducing back pressure losses in the air flow.

9 Claims, 2 Drawing Sheets

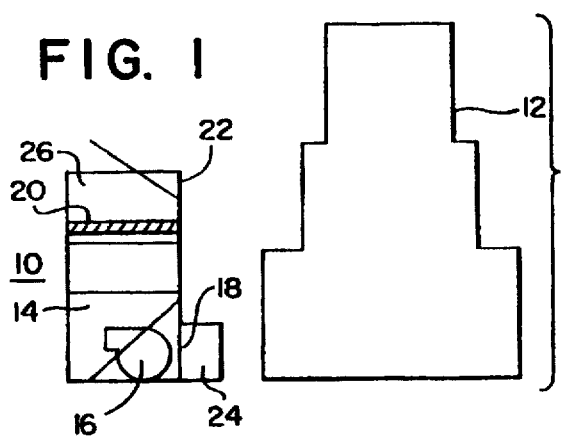
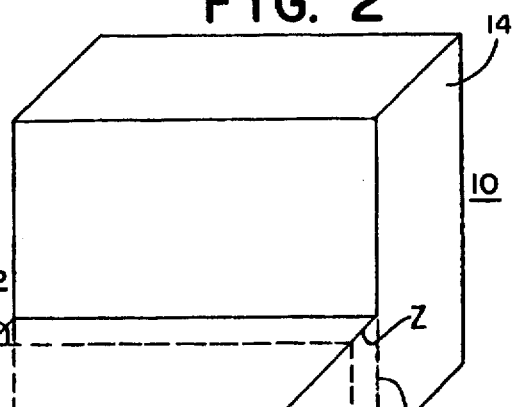
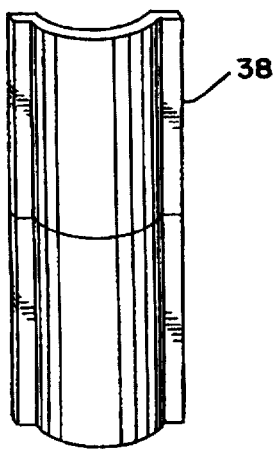
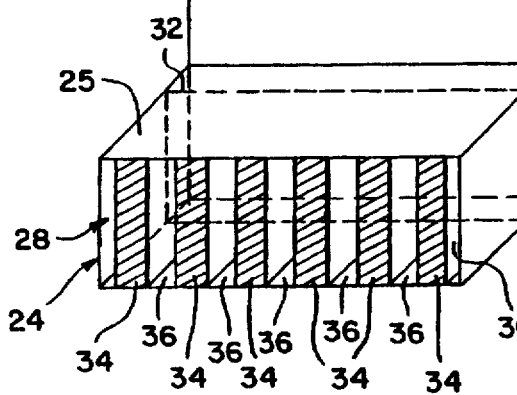
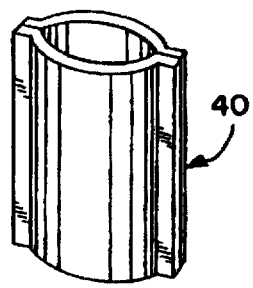
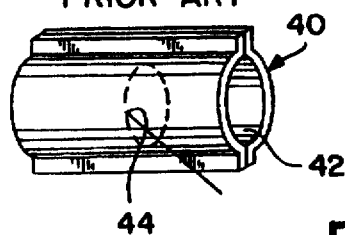
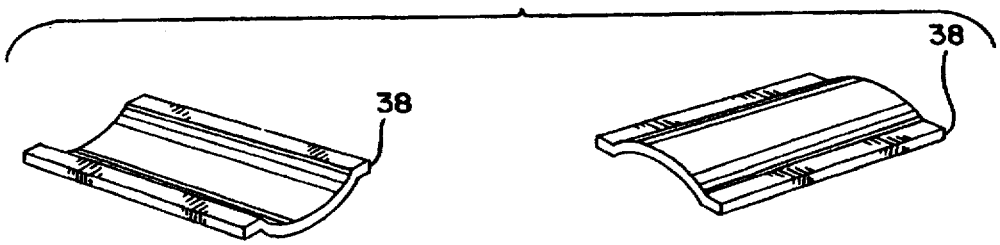

SOUND ATTENUATION ASSEMBLY FOR AIR-COOLING APPARATUS

BACKGROUND OF THE INVENTION

1. Field of the Invention

The present invention provides a sound attenuation assembly for utilization with air-cooling apparatus. More specifically, the invention provides an assembly that is particularly adaptable for utilization on forced-draft, liquid-to-air cooling apparatus at either, or both, the air entry port or the air discharge port of the air cooling apparatus.

2. Prior Art

Forced-draft, liquid-to-air cooling systems utilize air moving machinery, such as fans, which generate noticeable or significant noise. This noise at a certain decibel level is unacceptable in commercial buildings, urban settings and specific geographic regions or environments, such as Europe and Japan. Sound deflection barriers and sound absorbing members, which are referred to as attenuators, may be installed in the air flow path.

Sound deflection barriers have limited application as they may disturb the aesthetic appearance of the building, structure or surroundings. In addition, these barriers have limited effect in reducing the noise level and frequently require structural reinforcements against the wind. The added barrier structures can increase the cost and the overall size of the cooling apparatus.

The most frequently utilized devices to suppress an elevated decibel level are the sound absorbing members or attenuators. For sound abatement purposes, the sound absorbing members may be positioned at either the air inlet or air outlet side, or both, of the liquid-to-air cooling system. An exemplary attenuator system includes an enclosure with rectangular baffles therein of a sound absorbing material. This attenuator system is interposed in the air flow path either upstream of the air inlet or downstream of the air outlet for transmission of the air stream through the enclosure and baffle network. Generally these baffles have a rectangular configuration of a material, such as fiberglass. However, the baffles and their associated structure tend to be bulky and expensive. Further, use of the rectangular baffles increases significantly the static pressure losses along the air flow path.

There are known sound absorption devices, which are mountable on or from ceilings and walls. However, these devices are considered to be relatively expensive in comparison to attainment of sound attenuation by means of a baffle and enclosure arrangement.

SUMMARY OF THE INVENTION

A sound attenuation assembly for a forced-draft, liquid-to-air cooling apparatus constructed in accordance with the invention has an enclosure with a chamber, an air-entry aperture and an air-exit aperture. A plurality of elongate, generally cylindrical members are arranged in at least two rows across the air flow path through the chamber with the cylindrical members of the adjacent rows aligned with the gaps between adjacent cylindrical members of a given row to block the line of sight through the chamber from a sound source to a sound receiver. The assembly is mountable at either the cooling apparatus air inlet port or air exhaust, or an assembly may be provided at both the air inlet port and the air exhaust port, to reduce the sound decibel level associated with air flowing into and discharging from a cooling apparatus. Although the elongate members are generally cylindrical, it is not requisite that they be right cylinders or right cylindrical surfaces, as the surfaces may be irregularly shaped from the top end to the bottom end of the cylinder. Therefore, there may be a plurality of cylindrical diameters in each member. At either location of the attenuation assembly with the cooling apparatus, there will be a coupling plenum extending a distance of at least twice the smallest diameter of the largest elongate member in a row of members adjacent to the cooling apparatus port coupled to the attenuation member aperture.

BRIEF DESCRIPTION OF THE DRAWING

In the Figures of the drawing, like reference numerals identify like components, and in the drawing:

FIG. 1 is an elevational side view of an exemplary cooling tower in proximity to a structure or building;

FIG. 2 illustrates a diagrammatic attenuation chamber coupled to a liquid-to-air cooling apparatus;

FIG. 3 shows an elevational view of a wall absorber;

FIG. 4 shows an oblique of a horizontally hung absorber;

FIG. 5 illustrates an oblique view of a vertically hung absorber;

FIG. 6 illustrates oblique top and bottom views a ceiling tile absorber;

DETAILED DESCRIPTION OF THE PREFERRED EMBODIMENT

Figure 7:
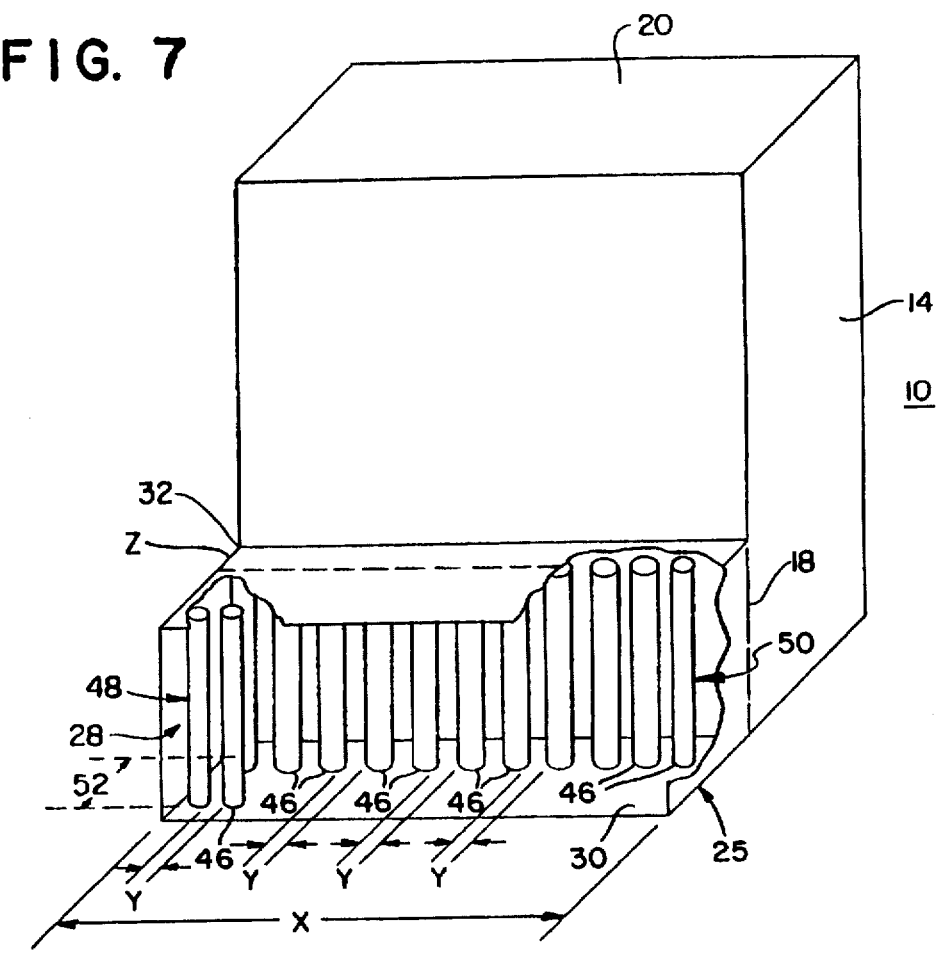
FIG. 7 is a diagrammatic illustration of the attenuation chamber of the present invention in a partial cutaway with some of the cylindrical baffles arranged in two rows.

In FIG. 1, a classical liquid-to-air cooling apparatus 10, which may include cooling towers or evaporators or condensers, is illustrated in proximity to an associated structure which would generally be a commercial facility such as an office building 12. Apparatus 10 has a cooling tower 14 with an air moving device 16, such as a fan, air inlet port 18 and an exhaust port 20 with sound barrier 22 interposed between structure 12 and exhaust port 20 to suppress the decibel level of the noise emanating from the air flow from exhaust port 20. FIG. 1 includes an exemplary illustration of an alternative configuration showing attenuation assemblies 24 and 26 positioned at inlet port 18 and exhaust port 20, respectively.

FIG. 2 shows an enlarged view and representation of attenuation assembly 24, which is representative of such assemblies. As assemblies 24 and 26 are similar in structure and operation only assembly 24 will be described but it will be understood that the description is applicable to assembly 26. In FIG. 2, attenuation assembly 24 is coupled to tower 14 at inlet port 18. Assembly 24 is shown With a generally rectangular housing 25, but the shape of the housing is not a limitation, merely an illustration. Assembly 24 has chamber 28 with air inlet 30, air outlet 32 and a plurality of baffles 34 longitudinally mounted in chamber 28 in the direction of air flow, as shown by the arrow. Individual baffles 34 in any row are separated by a gap 36 between adjacent baffles 34, although there is nothing that dictates such gaps 36 must be equal across cross-section 'x' of air inlet 30 in FIG. 2.

Air inlet 30 has cross-section or cross-sectional area 'x', and baffles 34 have a generally rectangular shape, which typically occupy between about 55% to 65% of cross-sectional area 'x'. Elongate baffles 34 are usually formed from a sound absorbing material, such as fiberglass. However, baffles 34 are bulky, generally expensive and impose significant pressure losses in the air flow through chamber 28.

Other sound suppressing devices, as illustrated in FIGS. 3 to 6, are known in the sound attenuation art. In FIG. 3, elongate, semielliptical shapes 38 of a sound-absorbing material are mountable on a wall in an ordered or linear array. In FIG. 4, a pair of the semielliptical shapes 38 are joined at their outer edges to form a pipe-like component 40 with a hollow passage 42 and a baffle 44 therein. Component 40 is suspended and hung horizontally to absorb the sound. FIG. 5 illustrates sound absorber component 40 arranged vertically. In FIG. 6, the sound absorbing shapes 38 are noted with their sides either convex up or concave up, which shapes 38 are mountable on a ceiling to absorb the sound. Although these absorbing shapes can be effective in confined spaces where air movement is only nominal, the cost of the sound suppressing devices as well as the installation cost are considered to be expensive for use in a forced air moving environment.

Figure 8:
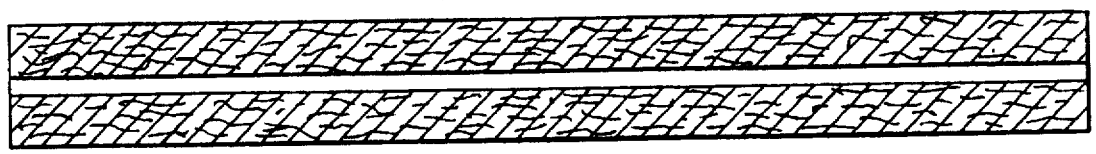
FIG. 8 illustrates an exemplary right cylindrical baffle in elevational view.
Figure 9:
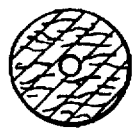
FIG. 9 illustrates an end view of the cylindrical baffle shown in FIG. 8.
Figure 10:
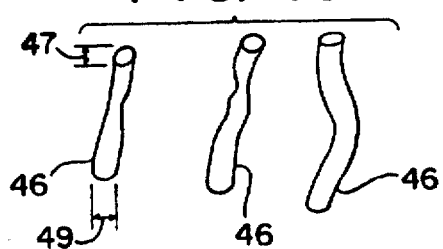
FIG. 10 illustrates exemplary irregularly shaped, but generally cylindrical baffles.

In FIG. 7, cylindrical baffles 46 are arranged in a first row 48 and a second row 50 across cross-sectional area 'x' in chamber 28. In this array, baffles 46 in each of rows 48 and 50 have a gap 52 between adjacent baffles 46. The air flow direction is through chamber 28 between inlet air port 30 and exhaust port 32. Baffles 46 of second row 50 are generally aligned with gap 'y', which is between baffles 46 of first row 48. Similarly baffles 46 of first row 48 are about aligned with gaps 'y' between baffles 46 of second row 50. In this illustration and in FIGS. 8 and 9, baffles 46 are shown as right cylinders. In FIG. 10, alternative shapes of the circular cylindrical form of baffle 46 illustrate that the form does not have to be a right cylinder. The cylindrical form could be a non-circular shape having a cross-sectional view different from the one shown in FIG. 9, for example such different form could be elliptical, oval or semi-annular. That is, the cylindrical forms could be oblique or erratic, as shown in an exaggerated format, for emphasis, in FIG. 10. In these erratic or oblique shapes, the cylinder 46 could have a multitude of varying cross sectional diameters. The separation distance between the adjacent rows 48 and 50 is at least the smallest cross-sectional dimensional diameter of the baffle members 46 in the adjacent rows. In FIG. 10, the smallest diameter 47 is depicted at the top of the first illustrative erratic cylinder and the largest diameter 49 is noted at the base of the same erratic cylinder. The separation gap 'y' is between about seventy percent and ninety-five percent of the smallest diameter of the baffle members 46 defining the gap 'y'.

Housing 25 in FIG. 7 is illustrated with first row 48 and second row 50 of baffles 46, however, it is understood that there may be any number of rows of baffles arranged across chamber 28. The connection of housing 25 to either air inlet port 18 or air discharge port 20 of tower 14 is arranged to provide a plenum distance 'z'. This separation distance is provided between baffles 46 and air inlet port 18, or between baffles 46 and discharge port 20 to minimize the air pressure losses along the air flow path.

In operation, at least two rows of baffles 46 block the line-of-sight from the sound source to the sound receiver. More specifically, in FIG. 7 air flows into chamber 28 through air inlet 30 for discharge into tower 14 at air-inlet port 18. However, the air passes through chamber 28 around baffles 46, through plenum 'z' and air outlet 32, and into air-inlet port 18. In this configuration, the line of sight of the air flow through chamber 28 from air inlet to air outlet is obscured. More particularly, air inlet 30 has a first cross-sectional area across chamber 28 and about normal to the direction of air-flow. The baffles 46 in rows 48 and 50 effectively provide an insertion loss, which is the decrease in sound power level measured at the location of the receiver when a sound attenuating element is inserted in the transmission path between the sound source and the receiver.

In the present invention, the insertion loss is considered to be manifested by a combination of the following two phenomena: 1) a multiple barrier effect of at least two rows of attenuators; and, 2) a sound absorption effect of the attenuator material. The multiple barrier effect is the frontal impact of the attenuators imposed on the sound front travelling from the sound source toward the receiver. As a consequence, the sound energy is reduced by being partially absorbed by the encountered surface of the attenuators and by being reflected into and dissipated in space 26.

Sound absorption is provided by the acoustical materials of the attenuators. These materials naturally act to absorb sound. The elements which account for the dissipation of the sound energy within the acoustical materials are small, air-filled pores formed between material fibers or felted minerals. As an example, cylindrical attenuators formed from layers of fiberglass with tiny fibers and interconnecting pores between the fibers have been utilized in certain applications.

The air static pressure loss associated with the sound attenuators of the present invention is less than the pressure loss with elongate baffles 34. As the cylindrical attenuator assembly has an over-all larger open area exposed to the air flow, that is in each cross-section the open area is narrowed only in spaces 'y' between adjacent cylinders. Even in the narrowed spaces 'y', the preferred spacing is larger than in known systems with rectangular baffles. Further, the narrow spaces 36 between baffles 34 in FIG. 2, have led to high velocity air channelling precluding smooth access of air to the intakes of fan 16, and consequently to additional pressure losses in the air flow. In the present invention, cylindrical attenuators render a streamlined surface to the air flow that expands downstream in a plenum between the attenuator row of baffles adjacent to inlet port 18, which results in a reduced inlet pressure loss. Thus, the reduced cost cylindrical baffles 46 reduce the air flow pressure losses, which results in a reduction in the use of energy by air moving devices 16 as well as in a reduced noise level from the operation of the apparatus 10.

Those skilled in the art will recognize that certain variations can be made in the illustrated embodiments. While only specific embodiments of the invention have been described and shown, it is apparent that various alterations and modifications can be made therein. It is, therefore, the intention in the appended claims to cover all such modifications and alterations as may fall within the true scope and spirit of the invention.

I claim:

1. A sound attenuation assembly for a forced-draft, liquid-to-air cooling apparatus having a forced draft apparatus with air moving devices, an air flow duct with an air inlet port, means for transferring heat and an apparatus exhaust port downstream of said heat transfer means, an air flow stream moving in an air flow direction communicates from said air inlet port through said apparatus to said exhaust port, said sound attenuation assembly comprising:

a housing having a wall, said wall having an inner surface, an outer surface and defining a chamber, an air-entry aperture and an air-exit aperture, said chamber having a longitudinal direction, said air flow stream communicates through said chamber in the chamber longitudinal direction, said housing couplable to said cooling apparatus, one of said air inlet port and air exhaust port communicating said air flow in said air flow direction through said air-entry aperture, said air-exit aperture and said chamber to one of said air flow duct air inlet port and the atmosphere;

a plurality of elongate, substantially cylindrical members, each said member of a material having an outer surface and a member longitudinal axis, at least a first row of said elongate members and a second row of said elongate members, which first and second rows are adjacent rows and separated by an interval distance, said elongate members in each said first and second rows substantially aligned and having a separation gap between adjacent members in said respective first and second rows;

said air flow moving in said air flow direction communicates through said chamber and around said first and second rows of elongate members, said first and second rows of said elongate members mounted in said chamber and having each said member longitudinal axis about parallel to each other and transverse to said air flow direction through said chamber, one of said first and second rows of elongate members in proximity to said air-entry aperture, and the other of said first and second rows in proximity to said air-exit aperture, said rows of elongated members arranged to provide said separation gap between adjacent members of one of said first and second rows aligned with the elongate members of the other of said first and second rows to block a line of sight through said chamber from a sound source to a sound receiver, a coupling plenum for positioning between one of said air-exit aperture and said air inlet port, and, said air exhaust port and said air-entry aperture, said elongate members having a plurality of diameters between a smallest diameter and a largest diameter, said coupling plenum extending a plenum distance between said one of said air-entry and air-exit apertures of said assembly housing and said exhaust and inlet, respectively, port of said apparatus, arrangement of said elongate members providing a multiple barrier effect of frontal impact of each said member outer surface on a sound front travelling from a source of sound in a direction through said sound attenuation assembly to a receiver of said sound, said barrier effect combines with sound absorption by said member material;

said sound attenuation assembly mountable at any of said cooling apparatus air inlet port and said cooling apparatus air exhaust port to receive and discharge air in said air flow direction and operable to reduce sound at a decibel level associated with air flowing into and discharging from a liquid-to-air cooling apparatus.

2. A sound attenuation assembly for a forced-draft, liquid-to-air cooling apparatus as claimed in claim 1, wherein each said elongate, substantially cylindrical member is a non-right cylinder with at least one cross-sectional diameter, a largest cylindrical diameter, and a smallest cylindrical diameter said separation gap between adjacent elongate members within each of said rows being between about seventy percent and ninety-five percent of the smallest cylindrical diameter of said member.

3. A sound attenuation assembly for a forced-draft, liquid-to-air cooling apparatus as claimed in claim 1, wherein each said elongate, substantially cylindrical member has at least one cross-sectional diameter, a largest cylindrical diameter and a smallest cylindrical diameter, said interval distance between said adjacent rows of elongate members is at least the smallest cylindrical diameter of said members in said adjacent rows.

4. A sound attenuation assembly for a cooling apparatus as claimed in claim 1 wherein said elongate, substantially cylindrical member material is a sound absorbing material.

5. A sound attenuation assembly for a forced-draft, liquid-to-air cooling apparatus as claimed in claim 1, further comprising a first sound attenuation assembly and a second sound attenuation assembly, each said sound attenuation assembly having a coupling plenum, one of said first and second sound attenuation assemblies and a respective coupling plenum coupled at said apparatus air inlet port and the other of said first and second assemblies coupled to said apparatus at said exhaust port.

6. A sound attenuation assembly as claimed in claim 1, further comprising a plurality of rows of said elongate, substantially cylindrical members mounted in said chamber, each said row having its elongate members substantially aligned with the separation gap between adjacent elongate members in the adjacent rows.

7. A sound attenuation assembly as claimed in claim 1 wherein said elongate member is a cylinder.

8. A sound attenuation assembly as claimed in claim 1, wherein said elongate member is a non-right cylinder with at least one cross-sectional diameter, a largest diameter and a smallest diameter, said coupling plenum distance between said row of elongate members adjacent to said one of said air-exit and air-entry apertures is at least twice the smallest diameter of the elongate member with the largest diameter in the row of said elongate members adjacent to said air-exit aperture.

9. A sound attenuation assembly as claimed in claim 4 wherein said elongate member material is hardened fiberglass.

* * * * *